United States Patent
Jeong

(10) Patent No.: US 10,778,036 B2
(45) Date of Patent: Sep. 15, 2020

(54) WIRELESS POWER TRANSMITTER

(71) Applicant: WITS Co., Ltd., Yongin-si, Gyeonggi-do (KR)

(72) Inventor: In Wha Jeong, Suwon-si (KR)

(73) Assignee: WITS Co., Ltd., Gyeonggi-do (KR)

( * ) Notice: Subject to any disclaimer, the term of this patent is extended or adjusted under 35 U.S.C. 154(b) by 723 days.

(21) Appl. No.: 15/432,139

(22) Filed: Feb. 14, 2017

(65) Prior Publication Data

US 2018/0090994 A1     Mar. 29, 2018

(30) Foreign Application Priority Data

Sep. 23, 2016 (KR) .................. 10-2016-0122242

(51) Int. Cl.
*H02J 50/12* (2016.01)
*G05F 3/00* (2006.01)
*H02J 7/02* (2016.01)

(52) U.S. Cl.
CPC ............... *H02J 50/12* (2016.02); *G05F 3/00* (2013.01); *H02J 7/025* (2013.01)

(58) Field of Classification Search
CPC .................................................. H02J 50/12
See application file for complete search history.

(56) References Cited

U.S. PATENT DOCUMENTS

| | | | |
|---|---|---|---|
| 2012/0293118 A1* | 11/2012 | Kim | H02J 5/005 320/108 |
| 2014/0015331 A1* | 1/2014 | Kim | H02J 5/005 307/104 |
| 2014/0084701 A1 | 3/2014 | Bae | |
| 2014/0361736 A1 | 12/2014 | Kwon et al. | |
| 2015/0008755 A1* | 1/2015 | Sone | H02J 50/12 307/104 |
| 2015/0311742 A1 | 10/2015 | Hatanaka et al. | |
| 2016/0308404 A1* | 10/2016 | Tsai | G01R 31/42 |
| 2018/0090994 A1* | 3/2018 | Jeong | H02J 50/12 |

FOREIGN PATENT DOCUMENTS

| | | |
|---|---|---|
| JP | 2014-183660 A | 9/2014 |
| KR | 10-2014-0040570 A | 4/2014 |
| KR | 10-2014-0143584 A | 12/2014 |

* cited by examiner

*Primary Examiner* — Daniel J Cavallari
(74) *Attorney, Agent, or Firm* — Harness, Dickey & Pierce, P.L.C.

(57) ABSTRACT

A wireless power transmitter includes: a current adjuster configured to convert an input power into a transmission current, which is periodically varied according to a transmission frequency; and a power transmitter configured to receive the transmission current and wirelessly transmit power according to the transmission frequency.

13 Claims, 5 Drawing Sheets

FIG. 7A $V_{ref}$
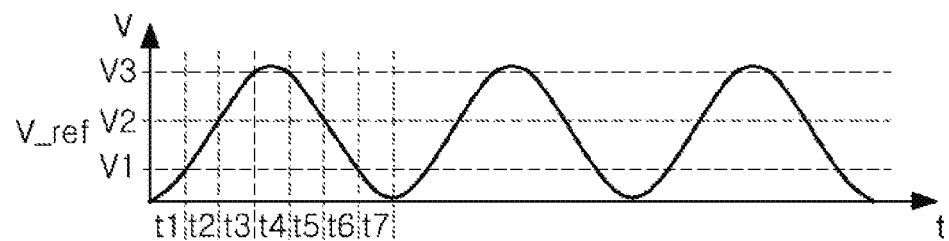
FIG. 7B $c1$
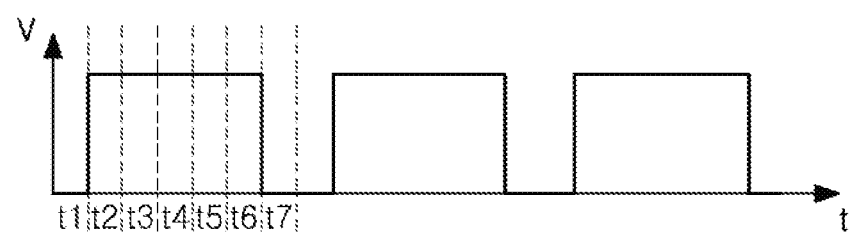
FIG. 7C $c2$
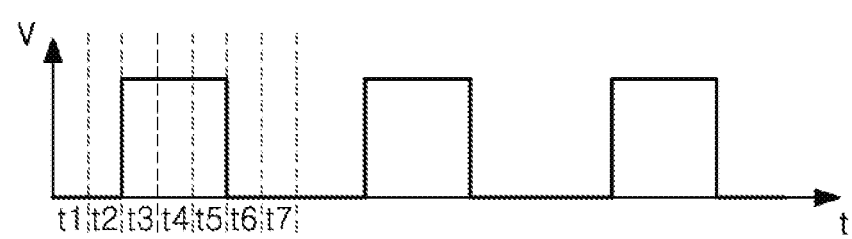
FIG. 7D $c3$
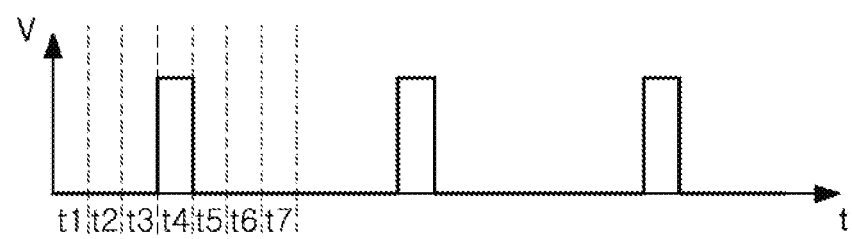

WIRELESS POWER TRANSMITTER

CROSS-REFERENCE TO RELATED APPLICATIONS

This application claims the benefit under 35 U.S.C. 119(a) of Korean Patent Application No. 10-2016-0122242 filed on Sep. 23, 2016 in the Korean Intellectual Property Office, the entire disclosure of which is incorporated herein by reference for all purposes.

BACKGROUND

1. Field

The following description relates to a wireless power transmitter that is capable of wirelessly transmitting power to a wireless power receiver.

2. Description of Related Art

A technology for wireless power transfer enabling power to be wirelessly transmitted and received through coils has been widely used in the chargers of various communications devices, including, for example, smartphones and various home appliances. This technology has a very wide field of potential future applications, such as being used for an electric vehicle. Various attempts to increase charging efficiency and reduce manufacturing costs have been conducted in the wireless power transfer technology field.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a wireless power transmitter includes: a current adjuster configured to convert an input power into a transmission current, which is periodically varied according to a transmission frequency; and a power transmitter configured to receive the transmission current and wirelessly transmit power according to the transmission frequency.

The current adjuster may include a variable impedance part connected to the power transmitter in series and having an impedance, which is periodically varied according to the transmission frequency.

The current adjuster may include: a control voltage generator configured to output a control voltage, which is periodically varied according to the transmission frequency; and a variable inductor connected to the power transmitter in series, and having an inductance, which is varied according to the control voltage.

The current adjuster may include: a resistance controller configured to output a control signal, which is periodically varied according to the transmission frequency; and a variable resistor connected to the power transmitter in series, and having a resistance value, which is varied according to the control signal.

The current adjuster may include: impedance elements including a terminal connected to a source voltage terminal to which the source voltage is input; switching elements connected between another terminal of each of impedance elements and the power transmitter; and a controller configured to output, to the switching elements, control signals, which are periodically varied according to the transmission frequency.

The controller may include: a reference signal generator configured to output a reference signal, which is periodically varied according to the transmission frequency; and control signal generators, each of which is configured to compare a voltage of the reference signal with a respective comparison voltage to output a corresponding control signal among the control signals.

The wireless power transmitter may further include a power source configured to output a direct current (DC) source voltage as the source voltage.

The wireless power transmitter may include a transmission coil and may exclude a transmission capacitor.

The wireless power transmitter may be configured to control a magnitude of the transmission current by exclusively adjusting an impedance of the current adjuster.

In another general aspect, a wireless power transmitter includes: a power transmitter configured to wirelessly transmit power according to a transmission frequency; and a current adjuster connected between a terminal to which a source voltage is input and the power transmitter, and having an impedance, which is periodically varied according to the transmission frequency.

The current adjuster may include: a control voltage generator configured to output a control voltage, which is periodically varied according to the transmission frequency; and a variable inductor connected to the power transmitter in series, and having an inductance, which is varied according to the control voltage.

The control voltage generator may include: resistors connected in series between a ground terminal and the terminal to which the source voltage is input; and a switching element configured to selectively connect a node among nodes between the resistors to an output terminal to thereby output a voltage between the connected node and the ground terminal as the control voltage.

The current adjuster may include: a resistance controller configured to output a control signal, which is periodically varied according to the transmission frequency; and a variable resistor connected to the power transmitter in series, and having a resistance, which is varied according to the control signal.

The current adjuster may include: impedance elements including a terminal connected to a source voltage terminal to which the source voltage is input; switching elements connected between another terminal of each of the impedance elements and the power transmitter; and a controller configured to output, to the switching elements, control signals, which are periodically varied according to the transmission frequency.

In another general aspect, a wireless power transmitter includes: a current adjuster connected to a terminal to which a direct current (DC) source voltage is applied, and having a varying impedance; and a transmission coil connected to the current adjuster in series to allow a transmission current flowing through the current adjuster to flow through the transmission coil.

The impedance may be periodically varied according to a transmission frequency, and the transmission coil may be configured to wirelessly transmit power according to the transmission frequency.

The wireless power transmitter may further include a power source configured to convert an alternating current (AC) source voltage into the DC source voltage, and output the DC source voltage.

Other features and aspects will be apparent from the following detailed description, the drawings, and the claims.

BRIEF DESCRIPTION OF DRAWINGS

FIGS. 7A to 7D are signal waveform diagrams illustrating operation of the current adjusters illustrated in FIGS. 5 and 6, according to an embodiment.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Hereinafter, embodiments will be described in detail with reference to the accompanying drawings.

Figure 1:
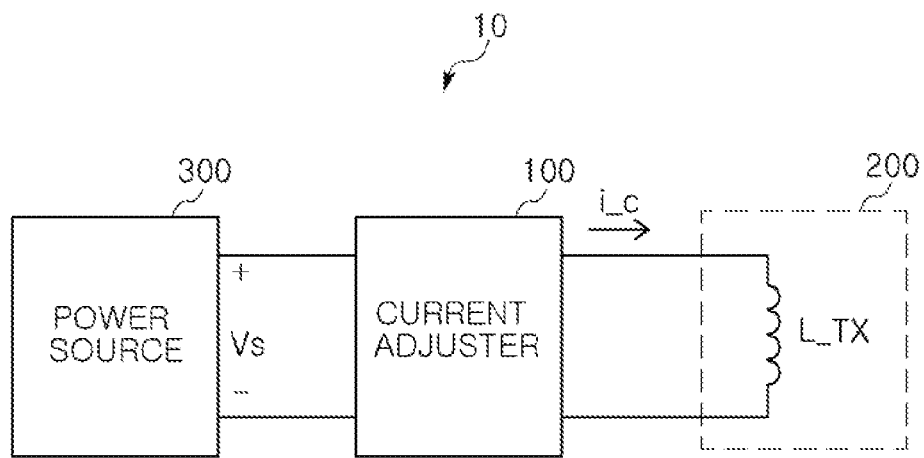
FIG. 1 is a block diagram of a wireless power transmitter, according to an embodiment.

FIG. 1 is a block diagram of a wireless power transmitter 10, according to an embodiment. The wireless power transmitter 10 includes a current adjuster 100 and a power transmitter 200. In addition, the wireless power transmitter 10 may further include a power source 300.

As impedance in the current adjuster 100 is varied over time, the current adjuster 100 varies a magnitude of transmission current i_c, input to the power transmitter 200. For example, when the impedance in the current adjuster 100 is periodically varied according to a transmission frequency, the current adjuster 100 periodically varies the magnitude of the transmission current i_c to the power transmitter 200 according to the transmission frequency. The varying impedance of the current adjuster 100 may be a resistance, an inductance, or a combination of the resistance and the inductance. A source voltage Vs, which is input to the current adjuster 100, may have any value. That is, the current adjuster 100 allows the transmission current i_c having a required magnitude and frequency to be input to the power transmitter 200, regardless of magnitude of the input source voltage Vs. The transmission current i_c may have any direct current (DC) offset, and may have a sine wave shape, a step wave shape, or any one of various other waveform shapes.

The power transmitter 200 receives the transmission current i_c, and wirelessly transmits power. For example, when the transmission current i_c, having a transmission frequency, is received by the power transmitter 200, the power transmitter 200 wirelessly transmits the power according to the transmission frequency. That is, a frequency of the power which is wirelessly transmitted may be the transmission frequency.

As illustrated in FIG. 1, the power transmitter 200 does not include a transmission capacitor. That is, the power transmitter 200 includes only a transmission coil L_TX.

The power source 300 supplies the source voltage Vs to the current adjuster 100. The source voltage Vs may be a DC voltage having any magnitude. That is, the power source 300 converts an alternate current (AC) voltage input from the outside into the source voltage Vs and outputs the converted source voltage Vs.

According to an embodiment, the current adjuster 100 directly adjusts the magnitude of the transmission current i_c flowing through the transmission coil L_TX. Therefore, the power transmitter 200 is implemented without a transmission capacitor or a resonance capacitor. In addition, the current adjuster 100 supplies an appropriate transmission current i_c to the transmission coil L_TX regardless of the magnitude of the source voltage Vs supplied to the current adjuster 100. That is, the power source 300 is implemented without a DC-DC converter.

Further, since the wireless power transmitter 10 controls the magnitude of the transmission current i_c by adjusting the impedance of the current adjuster 100, a control of the wireless power transmitter 10 is simplified. That is, the wireless power transmitter may often vary the transmission frequency of the power which is wirelessly transmitted, and the transmission frequency is determined by a frequency of the transmission current i_c flowing through the transmission coil L_TX. The current flowing through the current adjuster 100 may be substantially the same as the transmission current flowing through the transmission coil L_TX, and the current flowing through the current adjuster 100 may be simply adjusted through only adjusting impedance. Therefore, since the wireless power transmitter 10 may vary the transmission frequency through only adjusting the impedance of the current adjuster 100, the control of the wireless power transmitter 10 may be simplified.

Further, in a case in which the wireless power transmitter 10 is implemented without the power source 300, the wireless power transmitter 200 may be connected to an adapter to wirelessly transmit power. In this case, the wireless power transmitter 10 may wirelessly transmit power regardless of an output voltage of the connected adapter.

Figure 2:
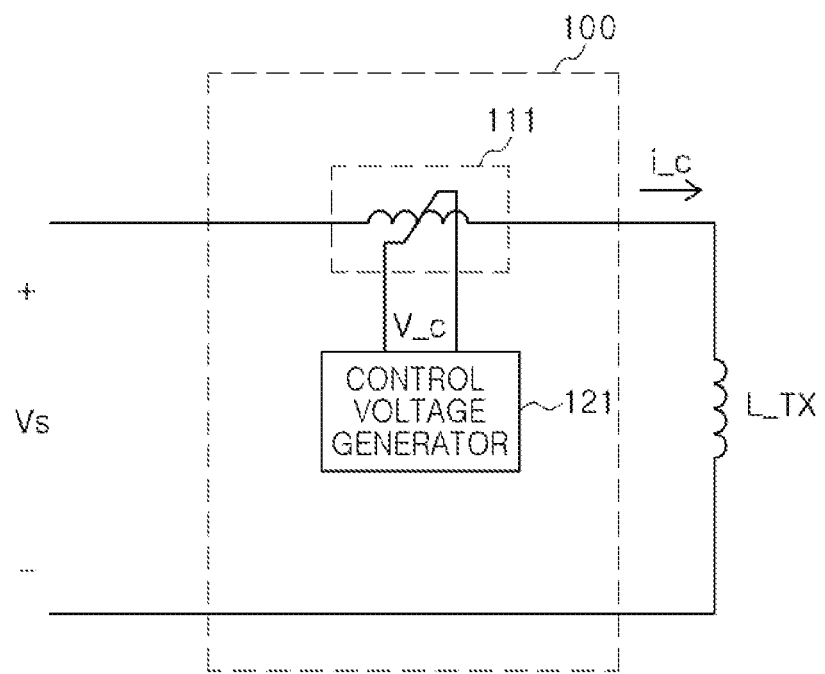
FIG. 2 schematically illustrates a configuration of a current adjuster of the wireless power transmitter, according to an embodiment.

FIG. 2 schematically illustrates a configuration of the current adjuster 100. As shown in FIG. 2, the current adjuster 100 includes a variable inductor 111 and a control voltage generator 121.

The variable inductor 111 is connected to the transmission coil L_TX in series, and inductance of the variable inductor 111 is varied according to a control voltage V_c. The control voltage V_c may be applied to a secondary winding coupled to an inductor core. That is, the variable inductor may include a primary winding wound around the inductor core and the secondary winding coupled to the inductor core. In this case, the control voltage V_c may be applied to the secondary winding. Further, the primary winding may be connected to the transmission coil L_TX in series, and inductance of the primary winding may be determined according to the control voltage applied to the secondary winding.

The control voltage generator 121 outputs the control voltage V_c, which may be varied over time. The control voltage V_c may be periodically varied according to a transmission frequency. Accordingly, the inductance of the variable inductor 111 may also be periodically varied according to the transmission frequency, and the magnitude of the transmission current i_c may also be periodically varied according to the transmission frequency.

As a result, the power having the transmission frequency is wirelessly transmitted by the transmission coil L_TX.

Although not illustrated in FIG. 2, the current adjuster 100 may further include a resistor connected to the variable inductor 111 in series in order to limit the magnitude of the transmission current i_c.

Figure 3:
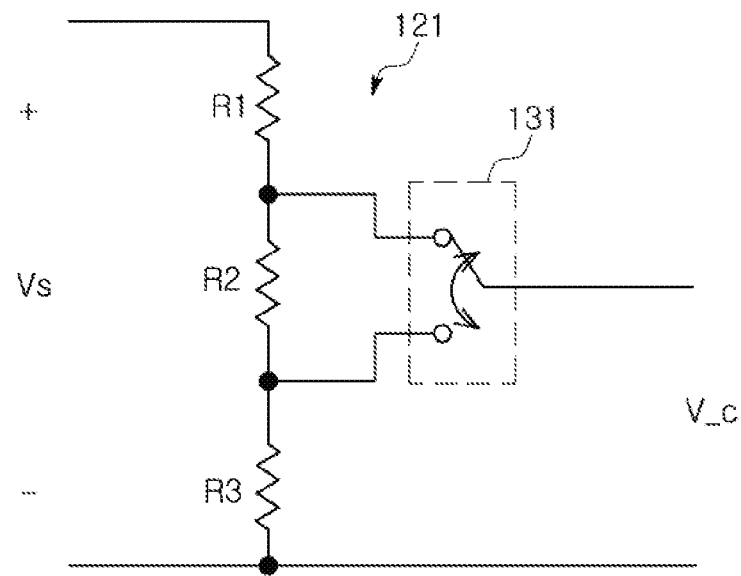
FIG. 3 schematically illustrates a control voltage generator of the current adjuster illustrated in FIG. 2, according to an embodiment.

FIG. 3 schematically illustrates a control voltage generator of the current adjuster 100, according to an embodiment. As shown in FIG. 2, the control voltage generator 121 includes resistors R1, R2, and R3, and a switching element 131.

The resistors R1, R2, and R3 are connected in series between a ground terminal and a terminal to which the source voltage Vs is applied.

The switching element 131 selectively connects a node among nodes between the resistors R1, R2, and R3 to an output terminal of the control voltage generator 121 to thereby output a voltage between the connected node and the ground terminal, as the control voltage V_c. For example, the switching element 131 selectively connects one of a first node, disposed between resistors R1 and R2, and a second node, between resistors R2 and R3, to the output terminal of the control voltage generator 121 to vary the magnitude of the control voltage V_c.

Although FIG. 3 illustrates a case in which the control voltage generator 121 includes three resistors R1, R2, and R3, the number of resistors may be determined as needed.

The wireless power transmitter 10 illustrated in FIGS. 1 through 3 is configured to periodically vary the magnitude of the transmission current i_c flowing through the transmission coil L_TX by periodically varying the inductance. Thus, the frequency of the transmission current i_c is determined by a frequency at which the inductance is varied.

Figure 4:
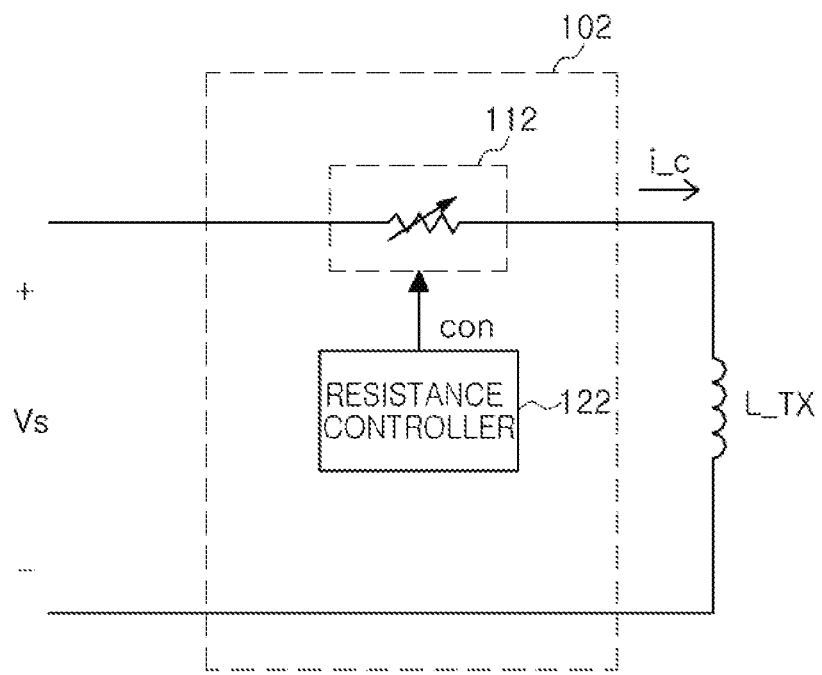
FIG. 4 schematically illustrates a configuration of a current adjuster of the wireless power transmitter, according to another embodiment.

FIG. 4 schematically illustrates a configuration of a current adjuster 102, according to another embodiment. The current adjuster 102 may be used in the wireless power transmitter 10, as an alternative the current adjuster 100. Referring to FIG. 4, the current adjuster 102 includes a variable resistor 112 and a resistance controller 122.

The variable resistor 112 is connected to the transmission coil L_TX in series, and a resistance value of the variable resistor 112 may be varied according to a control signal con.

The resistance controller 122 outputs the control signal con. The control signal con may be an analog signal having any voltage or current, and may also be a digital signal composed of any number of bits.

The wireless power transmitter 10 including the current adjuster 102 is configured to vary the magnitude of the transmission current i_c flowing through the transmission coil L_TX by periodically varying magnitude of the variable resistor 112. In this case, the frequency of the transmission current i_c is determined by a frequency at which the magnitude of the resistor is varied.

Figure 5:
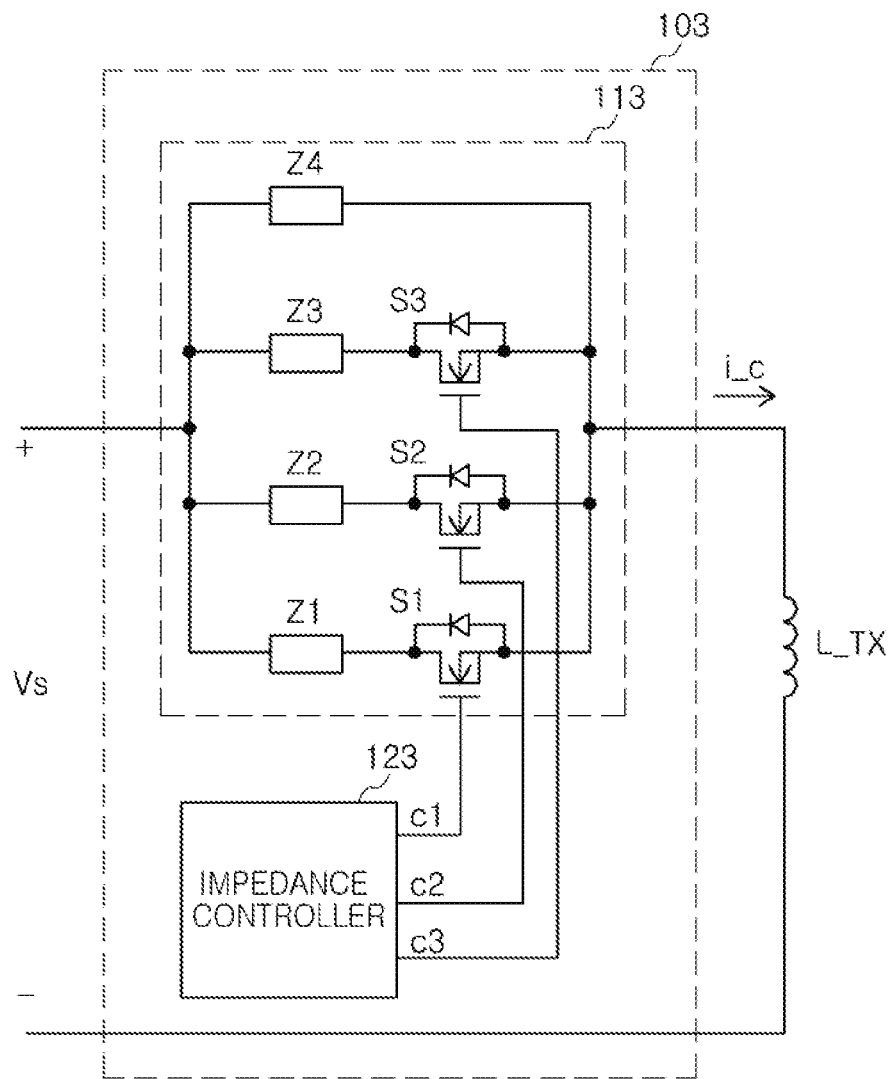
FIG. 5 schematically illustrates a configuration of a current adjuster of the wireless power transmitter, according to another embodiment.

FIG. 5 schematically illustrates a configuration of a current adjuster 103, according to another embodiment. The current adjuster 103 may be used in the wireless power transmitter 10, as an alternative the current adjusters 100 and 102. As shown in FIG. 5, the current adjuster 103 includes a variable impedance part 113 and an impedance controller 123.

The variable impedance part 113 is connected to the transmission coil L_TX in series, and an impedance of the variable impedance part 113 may be varied in response to first, second, and third control signals c1, c2, and c3. The variable impedance part 113 includes impedance elements Z1, Z2, Z3, and Z4, and switching elements S1, S2, and S3.

Each of the impedance elements Z1, Z2, and Z3 and each of the switching elements S1, S2, and S3 is connected between the terminal to which the source voltage Vs is applied and the transmission coil L_TX, in series. In addition, the impedance element Z4 is connected between the terminal to which the source voltage Vs is applied and the transmission coil L_TX.

Each of the impedance elements Z1, Z2, Z3, and Z4 may be implemented by a resistor, an inductor, or a combination of a resistor and an inductor. As described with reference to FIG. 2, in a case in which each of the impedance elements Z1, Z2, Z3, and Z4 is implemented by only an inductor, the wireless power transmitter 10 may further include a resistor connected to the variable impedance part 113 in series to limit the magnitude of the transmission current i_c.

Each of switching elements S1, S2, and S3 is turned on and off in response to a corresponding one of the control signals c1, c2, and c3, thereby enabling the impedance of the impedance part 113 to be varied.

The impedance controller 123 outputs the control signals c1, c2, and c3.

Figure 6:
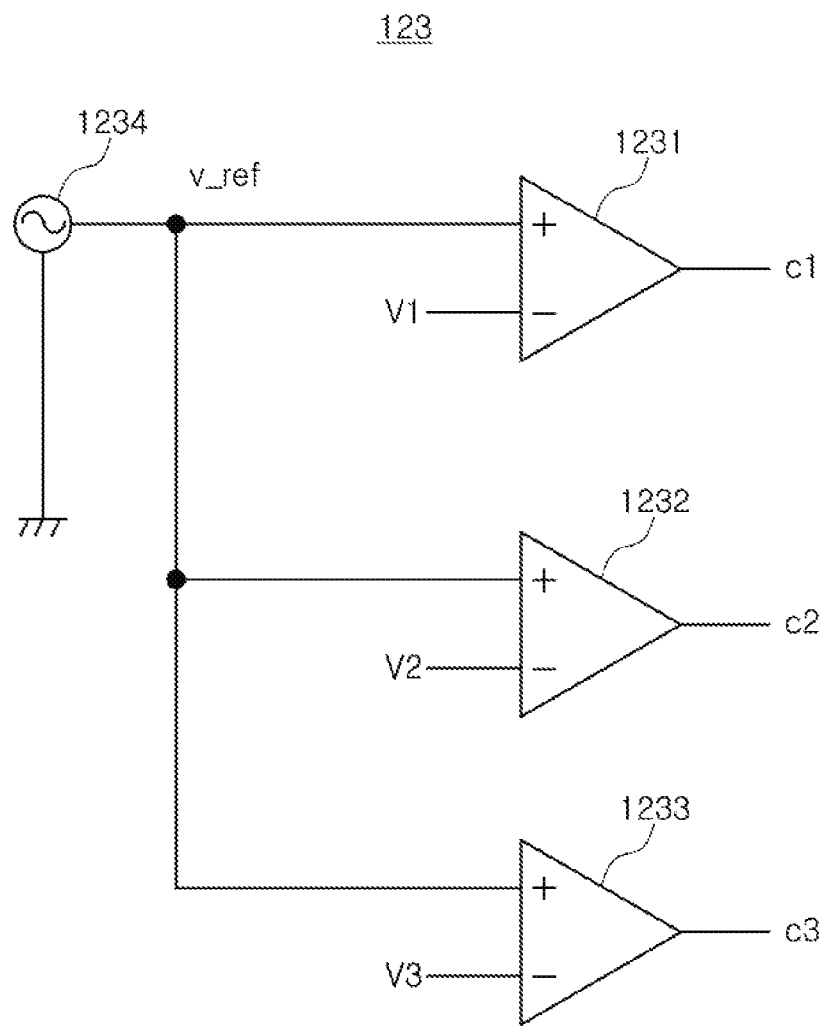
FIG. 6 schematically illustrates an impedance controller of the current adjuster illustrated in FIG. 5, according to an embodiment.

FIG. 6 schematically illustrates the impedance controller 123, according to an embodiment. As shown in FIG. 6, the impedance controller 123 includes a first comparator 1231, a second comparator 1232, a third comparator 1233, and a reference voltage generator 1234.

The reference voltage generator 1234 outputs a reference voltage v_ref, of which a magnitude may be periodically varied. The reference voltage v_ref may always have a positive value. In addition, the reference voltage v_ref may have a sine wave shape or a triangular wave shape. The frequency of the transmission current i_c is determined by a frequency of the reference voltage v_ref, and a frequency of the power which is wirelessly transmitted is determined by the frequency of the transmission current i_c.

The first comparator 1231 compares the reference voltage v_ref with a first voltage V1 to output the first control signal c1. The second comparator 1232 compares the reference voltage v_ref with a second voltage V2 to output the second control signal c2. A third comparator 1233 compares the reference voltage v_ref with a third voltage V3 to output the third control signal c3. The second voltage V2 may be greater than the first voltage V1, and the third voltage V3 may be greater than the second voltage V2.

FIGS. 7A-7D are signal waveform diagrams illustrating an operation of the current adjuster 103 according to the embodiments illustrated in FIGS. 5 and 6.

For example, if impedances of the impedance elements Z1, Z2, Z3, and Z4 have the same value z, and the resistor or the inductor is pure, an impedance of the variable impedance part in a section of time t1 is z, the impedance of the variable impedance part 113 in a section of time t2 is z/2, the impedance of the variable impedance part 113 in a section of time t3 is z/3, impedance of the variable impedance part 113 in a section of time t4 is z/4, the impedance of the variable impedance part in a section of time t5 is z/3, the impedance of the variable impedance part 113 in a section of t6 may be z/2, and impedance of the variable impedance part 113 in a section of t7 is z. Accordingly, the magnitude of the transmission current i_c is also periodically varied.

Although FIGS. 6 and 7A-7D illustrate an example case in which the impedances of the impedance elements Z1, Z2, Z3, and Z4 of the variable impedance part 113 of the current adjuster 103 of FIG. 5 have the same value, the respective values of the impedance elements Z1, Z2, Z3, and Z4 may be different from each other. In addition, depending on the impedance values of the impedance elements Z1, Z2, Z3, and Z4, the impedance controller 123 may also have various configurations, and, as a result, control signals which are different from the control signals c1, c2, and c3 illustrated in FIG. 7A-7D may also be output. That is, in order to allow the transmission current i_c to have an appropriate transmission frequency and magnitude, the impedance values of the impedance elements Z1, Z2, Z3, and Z4 may be variously set, and the control signals c1, c2, and c3 may also be variously output. In this case, each of the control signals c1, c2, and c3 are periodically varied according to the transmission frequency.

In addition, although FIG. 5 illustrates an example in which the variable impedance part 113 includes four impedance elements Z1, Z2, Z3, and Z4, the number of impedance elements may be increased or decreased, as needed.

As set forth above, according to the embodiments disclosed herein, a wireless power transmitter may increase charging efficiency and reduce manufacturing costs. Further, a wireless power transmitter according to the disclosed embodiments may also more easily vary a transmission frequency of wirelessly transmitted power.

The current adjuster 100 in FIGS. 1 and 2, the control voltage generator in FIGS. 2 and 3, the current adjuster 102 and the resistance controller 122 in FIG. 4, the current adjuster 103 in FIG. 5, and the impedance controller 123 in FIGS. 5 and 6 that perform the operations described in this application are implemented by hardware components configured to perform the operations described in this application that are performed by the hardware components. Examples of hardware components that may be used to perform the operations described in this application where appropriately include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components as described above may be written as computer programs, code segments, instructions or any combination thereof, for individually or collectively instructing or configuring the one or more processors or computers to operate as a machine or special-purpose computer to perform the operations that are performed by the hardware components as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components as described above.

The instructions or software to control computing hardware, for example, one or more processors or computers, to implement the hardware components as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A wireless power transmitter, comprising:
a current adjuster configured to convert an input power into a transmission current; and
a power transmitter configured to receive the transmission current and wirelessly transmit power,
wherein the current adjuster comprises,
impedance elements comprising a terminal connected to a source voltage terminal to which the input power is input,
switching elements connected between another terminal of each of impedance elements and the power transmitter, and
a controller configured to output control signals to the switching elements, and
wherein the controller comprises,
a reference signal generator configured to output a reference signal, and
control signal generators, each of which is configured to compare a voltage of the reference signal with a respective comparison voltage to output a corresponding control signal among the control signals.

2. The wireless power transmitter of claim 1, wherein the current adjuster comprises
a variable impedance part connected to the power transmitter in series and comprising an impedance.

3. The wireless power transmitter of claim 1, wherein the current adjuster comprises:
a control voltage generator configured to output a control voltage; and
a variable inductor connected to the power transmitter in series, and comprising an inductance, which is varied according to the control voltage.

4. The wireless power transmitter of claim 1, wherein the current adjuster comprises:
a resistance controller configured to output a control signal; and
a variable resistor connected to the power transmitter in series, and comprising a resistance value, which is varied according to the control signal.

5. The wireless transmitter of claim 1, further comprising:
a power source configured to output a direct current (DC) source voltage as a source voltage.

6. The wireless power transmitter of claim 1, wherein the power transmitter
comprises a transmission coil and excludes a transmission capacitor.

7. The wireless power transmitter of claim 1, wherein the wireless power transmitter is configured to control a magnitude of the transmission current by exclusively adjusting an impedance of the current adjuster.

8. A wireless power transmitter, comprising:
a power transmitter configured to wirelessly transmit power; and
a current adjuster connected between a terminal to which a source voltage is input and the power transmitter,
wherein the current adjuster comprises,
impedance elements comprising a terminal connected to a source voltage terminal to which the source voltage is input,
switching elements connected between another terminal of each of the impedance elements and the power transmitter, and
a controller configured to output control signals to the switching elements, and
wherein the controller comprises,
a reference signal generator configured to output a reference signal, and
control signal generators, each of which is configured to compare a voltage of the reference signal with a respective comparison voltage to output a corresponding control signal among the control signals.

9. The wireless power transmitter of claim 8, wherein the current adjuster comprises:
a control voltage generator configured to output a control voltage; and
a variable inductor connected to the power transmitter in series, and comprising an inductance, which is varied according to the control voltage.

10. The wireless power transmitter of claim 9, wherein the control voltage generator comprises:
resistors connected in series between a ground terminal and the terminal to which the source voltage is input; and
a switching element configured to selectively connect a node among nodes between the resistors to an output terminal to thereby output a voltage between the connected node and the ground terminal as the control voltage.

11. The wireless power transmitter of claim 8, wherein the current adjuster comprises:
a resistance controller configured to output a control signal; and
a variable resistor connected to the power transmitter in series, and comprising a resistance, which is varied according to the control signal.

12. A wireless power transmitter comprising:
a current adjuster connected to a terminal to which a direct current (DC) source voltage is applied, and comprising a varying impedance; and
a transmission coil connected to the current adjuster in series to allow a transmission current flowing through the current adjuster to flow through the transmission coil,
wherein the current adjuster comprises,
    impedance elements comprising a terminal connected to a source voltage terminal to which the DC source voltage is input,
    switching elements connected between another terminal of each of the impedance elements and the transmission coil, and
    a controller configured to output control signals to the switching elements, and
wherein the controller comprises,
    a reference signal generator configured to output a reference signal, and
    control signal generators, each of which is configured to compare a voltage of the reference signal with a respective comparison voltage to output a corresponding control signal among the control signals.

13. The wireless power transmitter of claim 12, further comprising a power source configured to convert an alternating current (AC) source voltage into the DC source voltage, and output the DC source voltage.

* * * * *